C. W. ALLEN.
FISHING FLY AND METHOD OF MAKING THE SAME.
APPLICATION FILED JULY 27, 1920.
1,388,156. Patented Aug. 23, 1921.
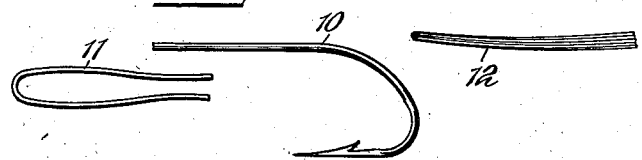
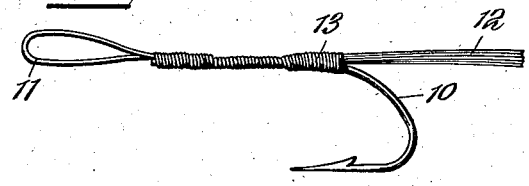
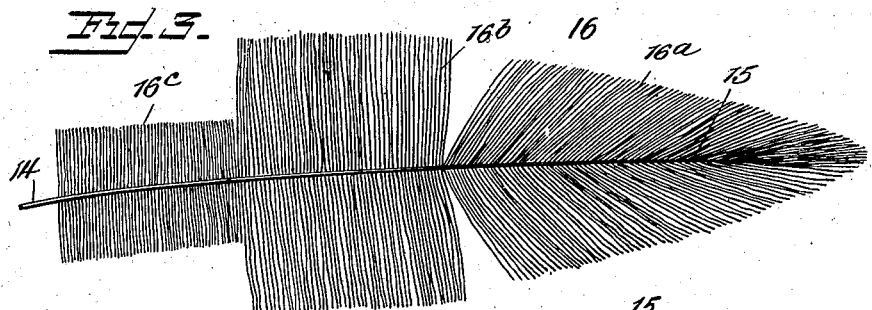
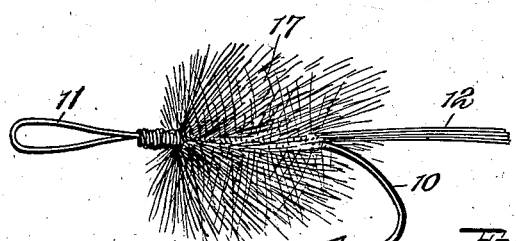
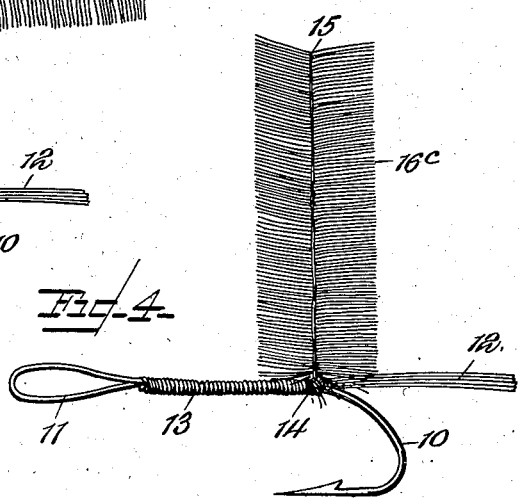
Chauncy W. Allen,
INVENTOR,
WITNESSES

UNITED STATES PATENT OFFICE.

CHAUNCY W. ALLEN, OF SACRAMENTO, CALIFORNIA.

FISHING-FLY AND METHOD OF MAKING THE SAME.

1,388,156.     Specification of Letters Patent.     Patented Aug. 23, 1921.

Application filed July 27, 1920. Serial No. 399,359.

*To all whom it may concern:*

Be it known that I, CHAUNCY W. ALLEN, a citizen of the United States, residing at Sacramento, in the county of Sacramento and State of California, have invented a new and useful Fishing-Fly and Method of Making the Same, of which the following is a specification.

This invention relates to that class of artificial baits known as fly hooks or fishing flies.

The principal object of the present invention is to provide a bait which will be alluring and attractive under all conditions, even after constant immersion in the water.

Artificial flies as now made are universally open to the objection that after they have been used for a comparatively few minutes they flatten or lose their shape and appear lifeless, with the result that it is nearly impossible to catch fish with them. Certain species of fish, particularly trout, are difficult to lure, and fishermen when using flies at present carry along with them a large supply so that as fast as one fly flattens or loses its formation, it may be removed from the line and a fresh fly substituted therefor.

The method of the present invention produces a fly which has the semblance of a dry fly and permanently maintains this appearance, not being affected by constant immersion in the water.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Figure 1 is a view showing a gut, a hook and a feather before being united to form the base or body of the improved fly.

Fig. 2 is a view showing the parts of Fig. 1 united.

Fig. 3 is a plan view on an enlarged scale of a feather showing the two steps in preparing the same before wrapping it about the parts illustrated in Fig. 2.

Fig. 4 shows the feather of Fig. 3 prepared and united to the body of Fig. 2 and ready for the wrapping operation.

Fig. 5 is a view showing the completed bait.

The reference numeral 10 designates a fishing hook which may be of any desired shape and size, the specific construction of the hook having nothing to do with the present invention. A gut 11 of any desired size is doubled into the form of a loop and employed to form the snell of the fly hook. A long narrow feather 12, preferably but not necessarily a tail feather from a rooster, is selected with proper regard to the desired color which the completed bait should have. The ends of the gut are laid adjacent the end of the hook remote from the barb, and the tail feather 12 is laid alongside the straight shank of the hook and a waxed thread or similar flexible element 13 is carefully wrapped about the shank of the hook so as to embrace the ends of the gut and the end of the tail feather 12, thereby uniting these three parts to form the body illustrated in Fig. 2.

A feather is next taken from the neck of a rooster or other fowl. This second feather comprises the quill 14, the rachis 15 and the barbs 16. Fig. 3 shows a feather having a portion of the barbs 16$^a$, a second portion 16$^b$ after they have been stripped back, a third portion 16$^c$ after they have been clipped or trimmed by a pair of shears. In practice, the entire feather is held near the point and is stripped by running the finger nail along the shaft of the feather to the quill so that all of the barbs stand straight out from the shaft in a more or less mussed or helter-skelter fashion so as to present the appearance of bristles, and after the barbs have been stripped back they are cut off and trimmed evenly throughout the length of the feather. The feather itself may be cut to the desired size by clipping off its ends, although preferably small feathers are used so that it is only necessary to strip back and trim the barbs. The length of the barbs after trimming depends upon the size of the fly. Then the quill end of the feather shaft is secured in any desirable way to the body, as illustrated in Fig. 4. One way of securing the feather is to introduce the quill between some of the coils of the wrapped waxed thread 13. Then the feather is wrapped, while a slight twist is given to its shaft during the wrapping operation, the wrapping proceeding from near the bend or curve of the hook, upwardly toward the snell or gut. When the wrapping is completed, the end of the rachis is secured in any desired way, as by thread for example, to the wrapped thread 13. The fly will now present the fuzzy, bristly appearance as indicated in Fig. 5, with the barbs 17 sticking out in all directions, presenting the appearance of the body of an insect when the bait is resting on the surface of a body of water.

The feather selected for the stripping and trimming operation is preferably of a color contrasting with that of the tail feather 12. Whatever the color selected may be is immaterial. The essential step in the present process and the one which distinguishes it from other processes of making flies is the stripping back of the barbs of the second feather and then trimming the barbs in the desired size after stripping. It is this stripping operation which makes the barbs stand out permanently from the body of the fly with all the stiffness of the bristles of a brush and refuse to lie straight again however long the fly may be subjected to immersion in the water. The bait has been found to be a killing one, especially for trout, this resulting from the constantly dry and lifelike appearance it presents when in the water.

What is claimed is:—

1. The method of making an artificial bait which consists in stripping back the barbs of a feather from tip to quill, securing one end of the feather to a hook, wrapping the feather spirally about the shank of the hook while applying torsion to the shaft of the feather to force the barbs of the feather in an outstanding position, and securing the other end of the feather to the hook.

2. The method of making artificial bait which consists in stripping back the barbs of a feather from the tip to the quill, cutting the barbs off evenly throughout the length of the feather, wrapping the feather about the shank of a hook, and securing the ends of the feather.

3. The method of making an artificial bait which consists in tying a snell or gut and a feather to the shank of a hook, stripping back the barbs of a second feather from the tip to the quill, cutting the stripped barbs off evenly throughout the length of the feather, wrapping the second feather about the shank of the hook, and securing the ends of the second feather.

4. The method of making an artificial bait which consists in tying a snell or gut and a feather to the shank of a hook, stripping back the barbs of a second feather from the tip to the quill, cutting the stripped barbs off evenly throughout the length of the feather, wrapping the second feather about the shank of the hook, applying torsion to the shaft of the feather, and securing the ends of the second feather.

5. The method of making an artificial bait which consists in laying the ends of a looped gut on the shank of a hook near the line end, laying a feather on the shank of the hook so that the feather lies in the longitudinal axis of said shank and extends beyond the bent portion thereof, uniting the gut, feather and hook by wrapping these parts with a flexible element, stripping back the barbs of the second feather from the tip to the quill, securing one end of the second feather to the hook, wrapping the second feather about the section of the hook where the flexible element is wrapped, and securing the other end of the second feather.

6. The method of making an artificial bait which consists in laying the ends of a looped gut on the shank of a hook near the line end, laying a feather on the shank of the hook so that the feather lies in the longitudinal axis of said shank and extends beyond the bent portion thereof, uniting the gut, feather and hook by wrapping these parts with a flexible element, stripping back the barbs of the second feather from the tip to the quill, cutting off the stripped barbs evenly, securing one end of the second feather to the hook, wrapping the second feather about the section of the hook where the flexible element is wrapped while twisting the shaft of the feather, and securing the other end of the second feather.

7. An artificial bait comprising a hook, a feather having its barbs stripped from tip to quill and wrapped about the hook with a torsional strain applied to its shaft, and means for securing the ends of said feather in position on the hook.

8. An artificial bait comprising a looped gut, a hook, an elongated feather laid alongside the shank of the hook, means securing both the gut and said feather to the hook, a second feather having its barbs stripped from tip to quill and trimmed off to an even length throughout, said second feather being wrapped about that portion of the hook supporting the gut and the first-named feather, the second-named feather having its ends secured whereby only its barbs are presented outwardly of the bait.

In testimony that I claim the foregoing as my own, I have hereto affixed my signature.

CHAUNCY W. ALLEN.